(12) United States Patent
Fujisaka et al.

(10) Patent No.: US 6,335,701 B1
(45) Date of Patent: Jan. 1, 2002

(54) RADAR SYSTEM AND COHERENT INTEGRATING METHOD THEREOF

(75) Inventors: Takahiko Fujisaka; Kimio Asaka; Yoshihito Hirano; Shusou Wadaka, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/649,842

(22) Filed: Aug. 28, 2000

(30) Foreign Application Priority Data

Nov. 2, 1999 (JP) ............................ 11-312876

(51) Int. Cl.7 ............................................. G01S 13/53
(52) U.S. Cl. ..................... 342/115; 342/196; 342/94; 342/116; 342/135
(58) Field of Search ........................... 342/89, 90, 93, 342/94, 98, 99, 101, 102, 104, 110, 111, 112, 115, 116, 132, 133, 135, 136, 137, 159, 162, 174, 194, 196, 202, 203

(56) References Cited

U.S. PATENT DOCUMENTS

| | | | | |
|---|---|---|---|---|
| 4,137,532 A | * | 1/1979 | Taylor, Jr. et al. | 342/93 |
| 4,618,864 A | * | 10/1986 | Martin et al. | 342/162 |
| 4,620,192 A | * | 10/1986 | Collins | 342/128 |
| 4,622,552 A | * | 11/1986 | Andrews et al. | 342/196 |
| 5,237,331 A | | 8/1993 | Henderson et al. | 342/54 |
| 5,510,796 A | * | 4/1996 | Applebaum | 342/162 |
| 5,808,580 A | * | 9/1998 | Andrews, Jr. | 342/162 |
| 5,815,250 A | * | 9/1998 | Thomson et al. | 356/5.01 |
| 5,990,824 A | * | 11/1999 | Harrison | 342/160 |
| 6,208,295 B1 | * | 3/2001 | Dogan et al. | 342/378 |

* cited by examiner

Primary Examiner—John B. Sotomayor (57) ABSTRACT

Disclosed is a radar system capable of obviating a problem that a sufficient improvement of an S/N ratio could not be obtained in the prior art, and comprising a transmitter/receiver for detecting a phase of a receiving signal reflected from an observation target, an A/D converter for converting the receiving signal into a digital signal, a range gate for extracting the receiving signal having a time corresponding to the predetermined pulse width, a data dividing unit for dividing the receiving signals in to two groups of data, an FFT unit for fast-Fourier-transforming one group of data of the two groups of data, an FFT unit for fast-Fourier-transforming the other group of data, a complex conjugating unit for taking a complex conjugate of an output of the FFT unit, a complex multiplying unit for performing a complex multiplication for the every same Doppler frequency component with respect to an output of the former FFT unit and an output of the complex conjugating unit, and a complex adder for executing a coherent addition of a result of the complex multiplication the same number of times as the repetitions with respect to the same Doppler frequency component. The receiving signals can be coherently integrated both in the pulse and between the pulses, and the S/N ratio can be improved.

10 Claims, 7 Drawing Sheets

RADAR SYSTEM AND COHERENT INTEGRATING METHOD THEREOF

BACKGROUND OF THE INVENTION

1. Field of the Invention

The present invention relates to a radar system for observing a moving object and the atmospheric air and measuring a velocity thereof, and to a coherent integrating method thereof.

2. Description of the Related Art

This type of conventional radar system transmits signals which are pulse-modulated for ranging, wherein electromagnetic waves such as light waves and radio waves serve as carrier waves. Then, the electromagnetic waves reflected by an observation target are received at an interval of a delay time corresponding to a distance from the measurement target. The receiving signal having a time equal to a pulse width is subjected to fast Fourier transform (FFT), thereby integrating the signal per Doppler frequency and measuring a moving velocity of the observation target. Therefore, an integration time for improving an S/N ratio is restricted by a transmission pulse width. Even when expanding the pulse width, the velocity of the observation target gradually changes with an elapse of time, and hence it is difficult to obtain sufficient effect in improving the S/N ratio by the coherent integration.

Figure 6:
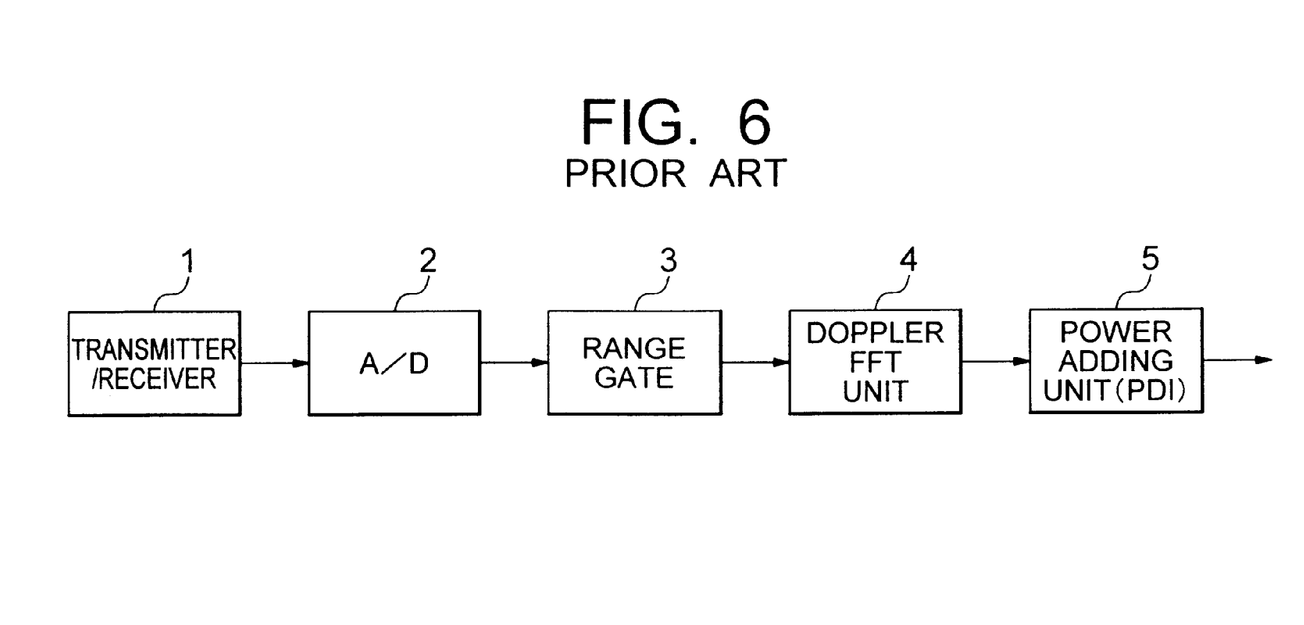
FIG. 6 is a block diagram showing a construction of a conventional radar system.

This type of conventional coherent radar system will be explained with reference to the drawings. FIG. 6 is a block diagram showing a construction of the conventional radar system disclosed in, e.g., U.S. Pat. No. 5,237,331.

Referring to FIG. 6, the radar system includes a transmitter/receiver 1, an A/D (Analog to Digital) converter 2, a range gate 3 for extracting a receiving signal with a delay time corresponding to a distance from an observation target, a Doppler FFT unit 4 for integrating the signal per Doppler frequency by executing a fast Fourier transform (FFT) of the receiving signal within a pulse width observed within the same range, and measuring a moving velocity of the observation target, and a PDI (Post Detection Integration) unit 5 for executing an incoherent integration (PDI) of a result of the FFT processing which has been gained by a series of processes described above from the receiving signals obtained per transmission pulse.

Figure 7:
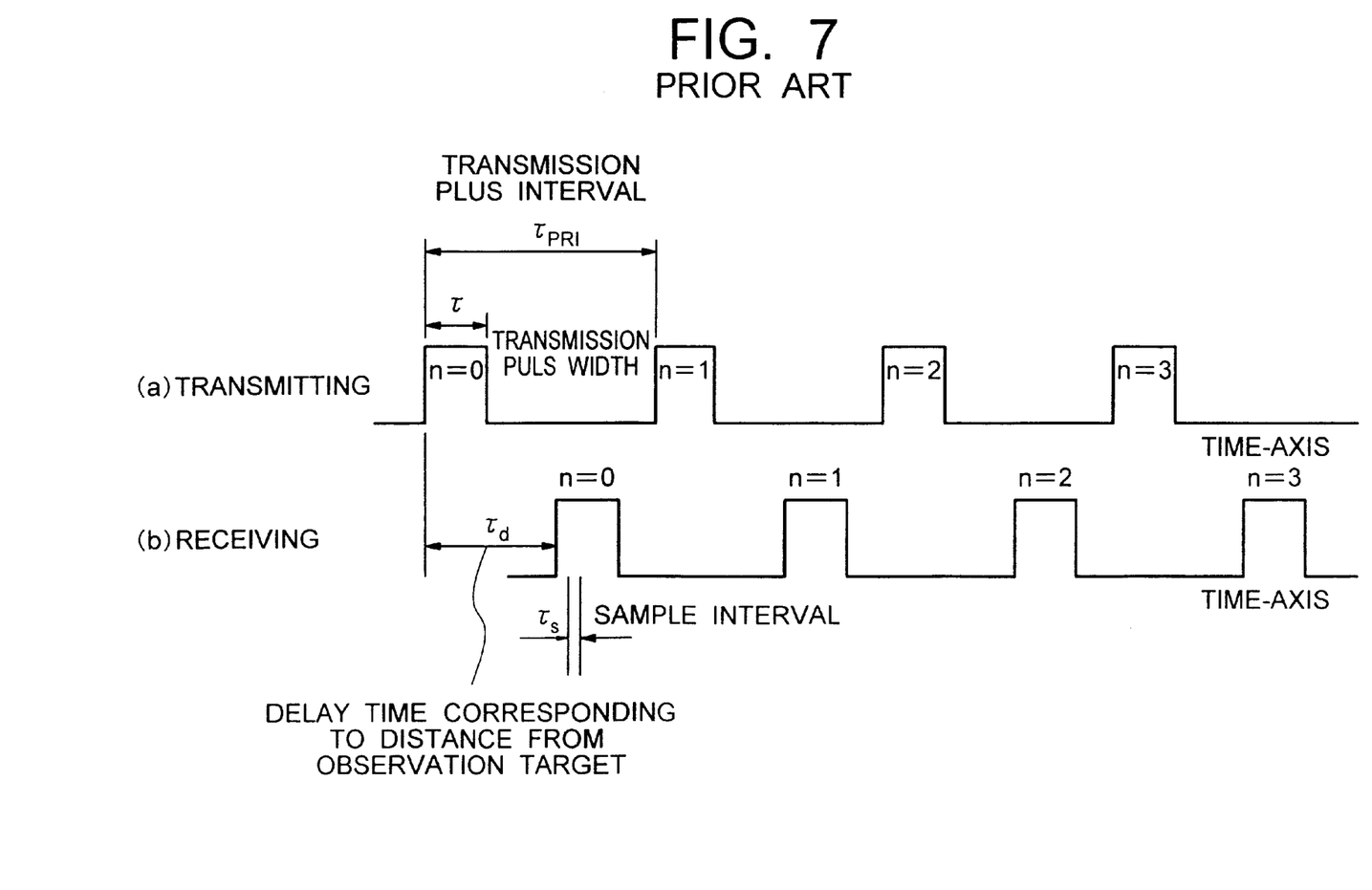
FIG. 7 is a timing chart showing an operation of the conventional radar system.

Next, an operation of the conventional radar system will be described with reference to the drawings. FIG. 7 is a timing chart showing a transmitting/receiving operation of the radar system illustrated in FIG. 6.

As shown in FIG. 7, the radar system repeatedly transmits electromagnetic waves which are pulse-modulated with a pulse width τ at a pulse interval τPRI (as in the case of the prior art system). The transmitter/receiver 1 detects a phase of the receiving signal, and the A/D converter 2 converts the receiving signal into a digital signal at a sampling interval τS. Then, the range gate 3 extracts the receiving signal having a time corresponding to the pulse width τ at an interval of a delay time τd corresponding to a distance from the observation target. This operation is repeated the same number of times as the number of transmission pulses. At this time, the digitized receiving signal can be expressed in the following formula (1) by use of a pulse number n and a sample number m in the pulse width.

$$S_{\tau d}(n,m) \quad \text{[Formula 1]}$$

m=0,1,2, ... , 2M−1
n=0,1,2, ... , N−1

This receiving signal Sτd (n, m) is converted into a Doppler spectrum Sτd (n, l) by the Doppler FFT unit 4. The spectrum Sτd (n, l) is given by the formula (2), where l=0, 1, 2, . . . , 2M−1 indicates a filter number of FFT, i.e., a Doppler frequency component number. According to the fast Fourier transform (FFT), the number of samples on the time-axis is 2M−1 equal to the number of samples on the frequency-axis.

$$S_{\tau d}(n, l) = \sum_{m=0}^{2M-1} S_{\tau d}(n, m) e^{-j2\pi \frac{ml}{2M}} \quad \text{[Formula 2]}$$

$l = 0, 1, 2, \ldots, 2M - 1$ $n = 0, 1, 2, \ldots, N - 1$

The Doppler spectrum Sτd (n, l) obtained per pulse hit is converted into electric power by a square-law detection as shown in the formula (3), and is PDIed, i.e., receives an addition of the number of pulse hits for the every same Doppler frequency component.

$$S_{out}(l) = \sum_{n=0}^{N-1} |S_{\tau d}(n, l)|^2 \quad \text{[Formula 3]}$$

$l = 0, 1, 2, \ldots, 2M - 1$

Generally, a greater effect in improving the S/N ratio which is gained by coherently adding the number of pulse hits per frequency component 1 of the obtained Doppler spectrum Sτd (n, l) in phase as a complex number is than by the PDI process of adding the number of pulses after the square-law detection. As compared with the pulse width, however, a pulse interval shows a several 10-fold through 100-fold breadth, and hence the coherent integration is difficult to attain due to a disturbance in terms of phase which might be caused by fluctuations in velocity of the target in that span. Therefore, in this type of conventional radar system, as explained above, there are conducted the intra-pulse-width coherent integration and the between-pulses incoherent integration (PDI).

As discussed above, this type of conventional radar system does not has a mechanism or a unit for compensating a change in the Doppler frequency due to variations in the moving velocity of the target when coherently integrating the receiving signal based on the FFT, with the result that the integration time is restricted short and the sufficient effect in improving the S/N ratio can not be obtained.

The problem inherent in the conventional radar system described above is that the coherent integration time is restricted due to the fluctuations in velocity of the observation target object or atmospheric air, and, even if the coherent integration is performed over a long period of time, the sufficient effect in ameliorating the S/N ratio is unable to be obtained.

SUMMARY OF THE INVENTION

It is a primary object of the present invention, which was devised to obviate the problems described above, to provide a radar system capable of sufficiently improving an S/N ratio with respect to an observation target that is difficult to execute a coherent integration between a plurality of pulses with a small influence by fluctuations in velocity of an observation target because of the fluctuations being short in time within a pulse width but with a disturbance in terms of phase of a receiving signal which might be caused by fluctuations in velocity thereof between the pulses.

To accomplish the above object, according to a first aspect of the present invention, a radar system comprises a transmitter/receiver for transmitting electromagnetic waves which are pulse-modulated with a predetermined pulse width at a predetermined pulse interval, and detecting a phase of a receiving signal reflected from an observation target, an A/D converter for converting the receiving signal into a digital signal at a predetermined sampling interval, a range gate for extracting the receiving signal having a time corresponding to the predetermined pulse width at an interval of a delay time corresponding to a distance from the observation target, a data dividing unit for dividing the receiving signals into two groups of data, which come from the observation target located at the same distance, a first Doppler FFT unit for fast-Fourier-transforming one group of data of the two groups of divided data, a second Doppler FFT unit for fast-Fourier-transforming the other group of data of the two groups of divided data, a complex conjugating unit for taking a complex conjugate of an output of the second Doppler FFT unit, a complex multiplying unit for performing a complex multiplication for the every same Doppler frequency component with respect to an output of the first Doppler FFT unit and an output of the complex conjugating unit; and a complex adder for repeating the observation and processing a plural number of times, and coherently adding an obtained result of the complex multiplication the same number of times as the repetitions with respect to the same Doppler frequency component.

According to a second aspect of the present invention, in the radar system according to the first aspect of the invention, the data dividing unit may include a switch for dividing the receiving signals outputted from the range gate into two groups of even-numbered data and odd-numbered data, a first memory for storing the even-numbered or odd-numbered data, and a second memory for storing the odd-numbered or even-numbered data. The first Doppler FFT unit fast-Fourier-transforms the data stored in the first memory, and the second Doppler FFT unit fast-Fourier-transforms the data stored in the second memory.

According to a third aspect of the present invention, in the radar system according to the first aspect of the invention, the data dividing unit may be a switch for dividing the signals outputted from the range gate into two groups of data based on a former half of an observation time and a latter half of the observation time. The radar system may further comprise a delay unit, provided posterior to the first Doppler FFT unit, for taking synchronism of an output of the first Doppler FFT unit for fast-Fourier-transforming the former half of the data and an output of the second Doppler FFT unit for fast-Fourier-transforming the latter half of the data.

According to a fourth aspect of the present invention, a radar system comprises a transmitter/receiver for transmitting repeatedly electromagnetic waves which are pulse-modulated with a predetermined pulse width at a predetermined pulse interval, and detecting a phase of a receiving signal reflected from an observation target, an A/D converter for converting the receiving signal into a digital signal at a predetermined sampling interval, a range gate for extracting the receiving signal having a time corresponding to the predetermined pulse width at an interval of a delay time corresponding to a distance from the observation target, a Doppler FFT unit for fast-Fourier-transforming two groups of data in time-division based on a former half of an observation time and a latter half of the observation time with respect to the signals outputted from the range gate, a delay unit for synchronizing an output of a result of the FFT processing of the former half of the data with a result of the FFT processing of the latter half of the data, a complex conjugating unit for taking a complex conjugate of an output of the Doppler FFT unit, a complex multiplying unit for performing a complex multiplication for the every same Doppler frequency component with respect to an output of the delay unit and an output of the complex conjugating unit, and a complex adder for repeating the observation and processing a plural number of times, and coherently adding an obtained result of the complex multiplication the same number of times as the repetitions with respect to the same Doppler frequency component.

According to a fifth aspect of the present invention, a radar system comprises a transmitter/receiver for transmitting repeatedly electromagnetic waves which are pulse-modulated with a predetermined pulse width at a predetermined pulse interval, and detecting a phase of a receiving signal reflected from an observation target and A/D converter for converting the receiving signal into a digital signal at a predetermined sampling interval, a range gate for extracting the receiving signal having a time corresponding to the predetermined pulse width at an interval of a delay time corresponding to a distance from the observation target, an initial phase compensating unit for compensating a phase so that an initial phase of the receiving signal coming from the observation target located at the same distance becomes zero, a Doppler FFT unit for fast-Fourier-transforming the receiving signal after compensating the phase, and a complex adder for repeating the observation and processing a plural number of times, and coherently adding an obtained result of the FFT processing the same number of times as the repetitions with respect to the same Doppler frequency component.

According to a sixth aspect of the present invention, a coherent integrating method of a radar system, comprises a step of extracting a receiving signal sampled within one pulse per transmission pulse from receiving signal data, a step of dividing the extracted receiving signal data for one pulse hit into two groups of data, a step of fast-Fourier-transforming each piece of data among the two groups of the divided receiving signal data, a step of performing a complex conjugating operation of one of two FFT processing results, a step of executing a complex multiplication of the other FFT processing result of the two FFT processing results and a result of the complex conjugating operation, and a step of repeatedly executing the processes up to the complex multiplication with respect to an arbitrary number of transmission pulses, and performing a complex addition of an obtained result of the complex multiplication for the every same Doppler frequency component.

According to a seventh aspect of the present invention, in the coherent integrating method according to the sixth aspect of the invention, the dividing step may be to divide every set of the extracted receiving signal data for one pulse hit into even-numbered data and odd-numbered data.

According to an eighth aspect of the present invention, in the coherent integrating method according to the sixth aspect of the invention, the dividing step may be to divide the extracted receiving signal data for one pulse hit into two groups of data based on a former half of a pulse width and a latter half of the pulse width, and the method may further comprise a step of delaying the former half of the fast-Fourier-transformed data by a predetermined time in order to take synchronism of the former half of the fast-Fourier-transformed data and the latter half of the fast-Fourier-transformed data.

According to a ninth aspect of the present invention, a coherent integrating method of a radar system, comprises a step of extracting a receiving signal sampled within one pulse per transmission pulse from receiving signal data, a step of fast-Fourier-transforming the extracted receiving signals into two groups of data based on a former half of an observation time and a latter half of the observation time, a step of delaying the former half of the fast-Fourier-transformed data by a predetermined time in order to take synchronism of the former half of the fast-Fourier-transformed data and the latter half of the fast-Fourier-transformed data, a step of executing a complex conjugating operation with respect to one of two FFT processing results, a step of executing a complex multiplication of the other FFT processing result of the two FFT processing results and a result of the complex conjugating operation, and a step of repeatedly executing the processes up to the complex multiplication with respect to an arbitrary number of transmission pulses, and performing a complex addition of an obtained result of the complex multiplication for the every same Doppler frequency component.

According to a tenth aspect of the present invention, a coherent integrating method of a radar system, comprises a step of extracting a receiving signal sampled within one pulse per transmission pulse from receiving signal data, a step of compensating a phase so that an initial phase of the receiving signal coming from an observation target located at the same distance becomes zero, a step of fast-Fourier-transforming the receiving signal data after compensating the phase, and a step of repeatedly executing the processes up to the FFT processing with respect to an arbitrary number of transmission pulses, and performing a complex addition of an obtained result of the FFT processing for the every same Doppler frequency component.

DESCRIPTION OF THE PREFERRED EMBODIMENTS

Figure 1:
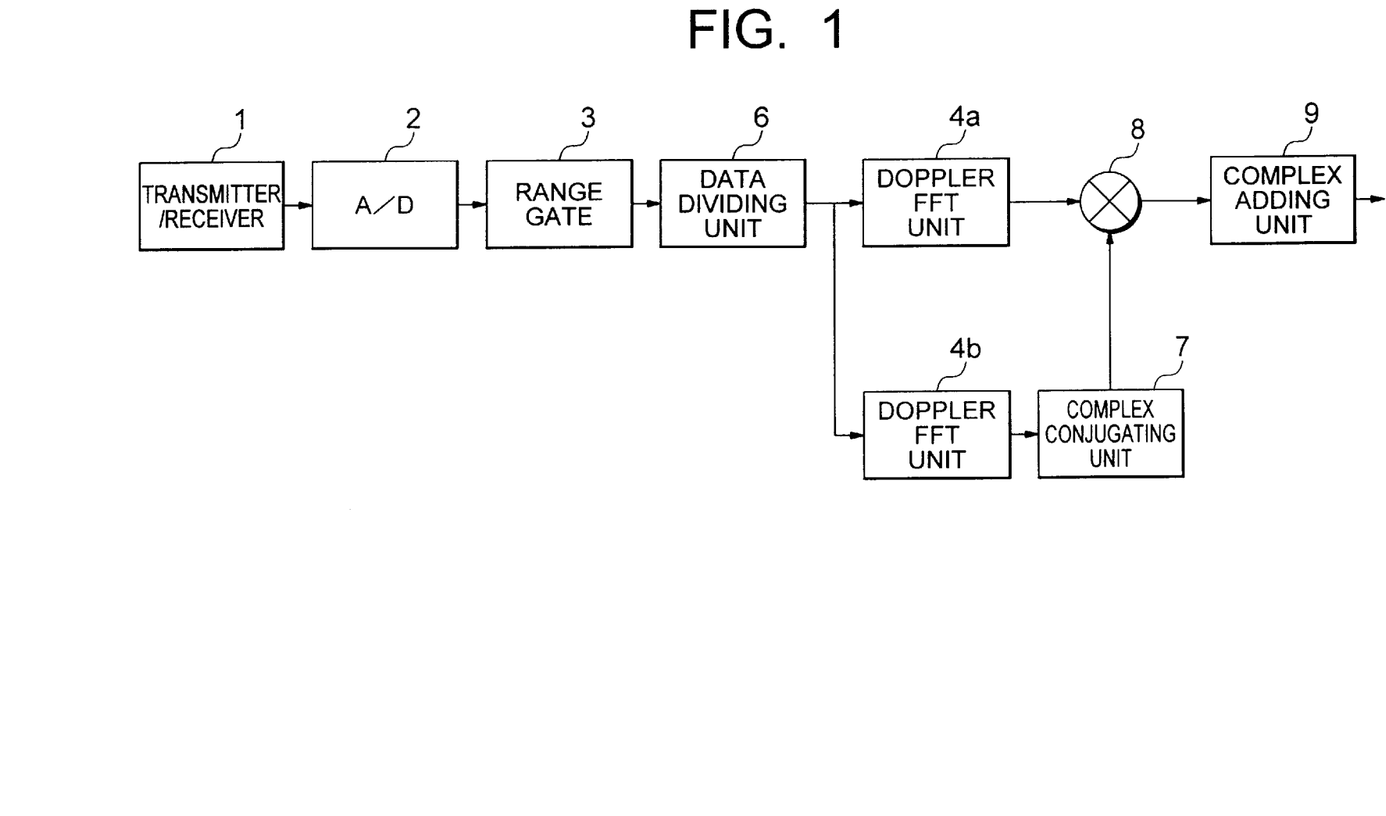
FIG. 1 is a block diagram showing a construction of a radar system in an embodiment 1 of the present invention.

Embodiment 1:

A radar system in an embodiment 1 of the present invention will hereinafter be described with reference to the accompanying drawings. FIG. 1 is a block diagram showing a construction of the radar system in the embodiment 1 of the present invention. Note that the same numerals indicate the identical or corresponding components throughout the drawings.

Referring to FIG. 1, the radar system includes a transmitter/receiver 1 for transmitting and receiving a signal that is pulse-modulated for ranging, in which electromagnetic waves such as light waves and radio waves serve as carrier waves. The radar system further includes an A/D (Analog to Digital) converter 2, a range gate 3 for extracting a receiving signal with a delay time corresponding to a distance from an observation target, and Doppler FFT units 4a, 4b for integrating the signal per Doppler frequency by executing fast Fourier transform (FFT) of the receiving signals within a pulse width observed within the same range, and measuring a moving velocity of the observation target. This radar system still further includes a data divider 6 for dividing the receiving signals into two groups of data, a complex conjugating unit for obtaining a complex conjugate of an output signal from the Doppler FFT unit 4b, a complex multiplying unit 8 for performing a complex multiplication of an output signal of the Doppler FFT unit 4a and an output signal of the complex conjugating unit 7, and a complex adder 9 for performing a coherent addition of an output signal of the complex multiplying unit 8. Note that the complex multiplying unit 8 executes the complex multiplication with respect to the every same Doppler frequency.

Next, an operation of the radar system in the embodiment 1 will be explained referring to the drawings.

FIG. 7 shows a transmitting/receiving timing of this radar system, wherein the radar system repeatedly transmits electromagnetic waves which are pulse-modulated with a pulse width τ at a pulse interval τPRI as in the case of the prior art system. The transmitter/receiver 1 detects a phase of the receiving signal, and the A/D converter 2 converts the receiving signal into a digital signal. The range gate 3 extracts the receiving signal having a time corresponding to the pulse width τ at an interval of a delay time τd corresponding to a distance from the observation target.

The data divider 6 newly added divides the receiving signals each having the time corresponding to the pulse width τ which are outputted from the range gate 3, into two groups of data.

Then, each piece of data among the two-groups of data is converted into a Doppler spectrum of the receiving signal by the Doppler FFT units 4a and 4b. The Doppler spectrum obtained by the Doppler FFT units 4a and 4b is what the receiving signals are decomposed at every Doppler frequency and the same Doppler frequency components are subjected to a coherent integration.

The complex conjugating unit 7 obtains a complex conjugate of the output signal (Doppler spectrum) of the Doppler FFT unit 4b. The complex multiplying unit 8 executes the complex multiplication of the output signal of the complex conjugating unit 7 and the output signal of the Doppler FFT unit 4a with respect to the every same Doppler frequency component. With the complex multiplication and the complex conjugate of these two Doppler spectrums, a phase of each frequency component of the Doppler spectrum takes a fixed value at each of all pulse hits irrespective of a velocity of the observation target.

Accordingly, the observation and the processing are repeated a plural number of times, and the obtained result is simply subjected to the complex addition in the complex adder 9 with respect to the same Doppler frequency component the same number of times as the above repetitions, whereby the receiving signals can be coherently integrated for the number of pulse hits.

The radar system in the embodiment 1 is constructed so that the receiving signals are divided into the two groups of data, the Doppler spectrum with respect to each piece of data is obtained, a result of the complex conjugation of one Doppler spectrum is obtained, and the complex multiplication of the other Doppler spectrum is carried out. This system architecture yields effects which follow. That is, regardless of the velocity of the observation target, the receiving signals can be coherently integrated both within the pulse and between pulses simply by repeating the observation and the processing a plural number of times and effecting the complex addition of the obtained result the same number of times as the repetitions. Besides, an effect of sufficiently improving an S/N ratio is obtained.

Figure 2:
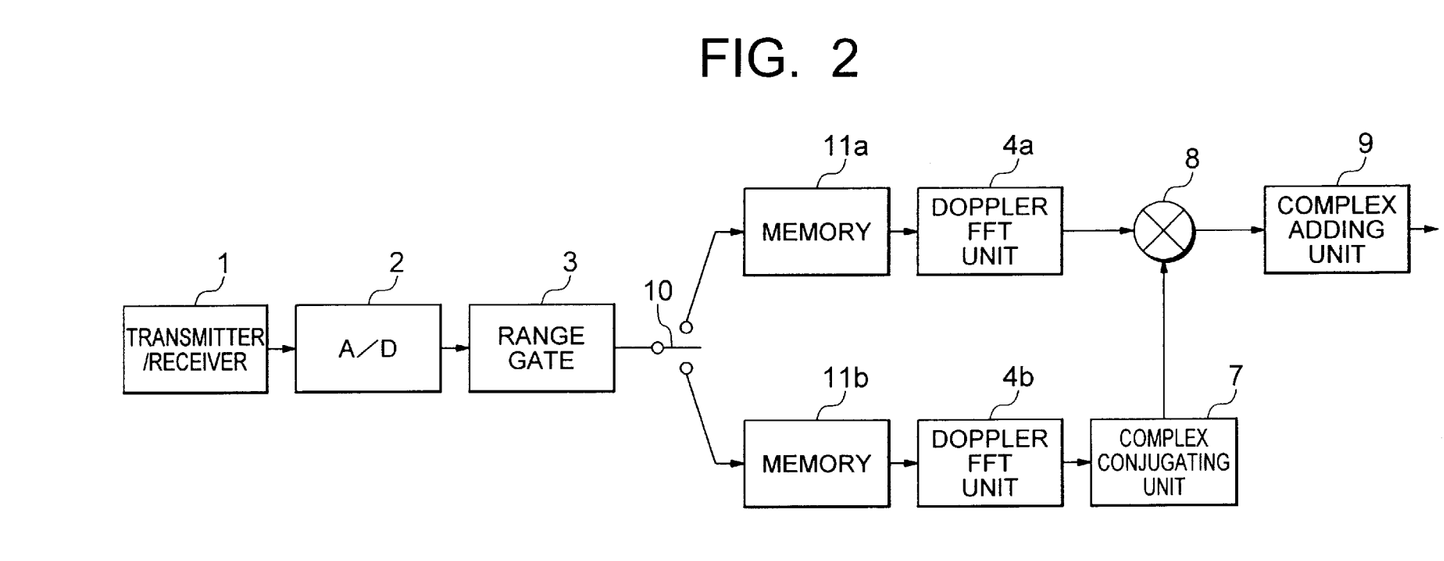
FIG. 2 is a block diagram showing a construction of the radar system in an embodiment 2 of the present invention.

Embodiment 2:

The radar system in an embodiment 2 of the present invention will be described with reference to the drawings. FIG. 2 is a block diagram showing a construction of the radar system in the embodiment 2 of the present invention.

Referring to FIG. 2, a switch 10 gives numbers to the receiving signals outputted from the range gate 3 and switches over connections so that the thus given numbers are divided into two groups of even-numbered data and odd-numbered data, and memories 11a, 11b respectively store the even-numbered data and the odd-numbered data outputted from the switch 10. Note that the same components in the embodiment 2 as those in the embodiment 1 and of the prior art system are marked with the same numerals, of which the repetitive explanations are herein omitted.

Next, an operation of the radar system in the embodiment 2 will be explained referring to the drawings.

The newly added switch 10 gives the numbers to receiving signals Sτd (n, m) (Formula (1)) in the sequence of their having been sampled, which are outputted from the range gate 3, and divides the receiving signals into two groups of the even-numbered data Seven τd (n, k) and the odd-numbered data Soddτd (n, k) (Formulae (4) and (5)).

$$S_{\tau d}(n,m) \qquad \text{[Formula 1]}$$

$$m = 0, 1, 2, \ldots, 2M-1$$
$$n = 0, 1, 2, \ldots, N-1$$

$$S_{\tau d}^{even}(n,k) = S_{\tau d}(n,2k) \qquad \text{[Formula 4]}$$

$$S_{\tau d}^{odd}(n,k) = S_{\tau d}(n,2k+1) \qquad \text{[Formula 5]}$$

$$k = 0, 1, 2, \ldots, M-1$$
$$n = 0, 1, 2, \ldots, N-1$$

For generating these two groups of receiving signals Seven τd (n, k) and Soddτd (n, k), the switch 10 switches over per sample the connections between the range gate 3 and the two upper and lower memories 11a, 11b in FIG. 2. When the respective memories have been stored with the even-numbered data and the odd-numbered data, the Doppler FFT units 4a, 4b convert them into Doppler spectrums Seven τd (n, l) and Soddτd (n, l) as shown in the following formulae (6) and (7). It is to be noted that the memories 11a, 11b are respectively stored with the even-numbered data and the odd-numbered data, and may also be stored with the odd-numbered data and the even-numbered data in exchange.

$$S_{\tau d}^{even}(n, l) = \sum_{k=0}^{M-1} S_{\tau d}^{even}(n, k) e^{-j2\pi \frac{kl}{M}} \qquad \text{[Formula 7]}$$

$$S_{\tau d}^{odd}(n, l) = \sum_{k=0}^{M-1} S_{\tau d}^{odd}(n, k) e^{-j2\pi \frac{kl}{M}}$$

$$k = 0, 1, 2, \ldots, M-1$$
$$n = 0, 1, 2, \ldots, N-1$$

Each of the Doppler spectrums Seven τd (n, l) and Soddτd (n, l) obtained by the Doppler FFT units 4a, 4b, is what the receiving signals are decomposed per Doppler frequency l and the in-pulse sample data is coherently integrated with respect to the same Doppler frequency component l. The complex conjugating unit 7 obtains a complex conjugate Soddτd (n, l)* of the output signal Soddτd (n, l) (Doppler spectrum) of the Doppler FFT unit 4b. The complex multiplying unit 8 performs the complex multiplication of the output signal Soddτd (n, l)* of the complex conjugating unit 7 and the output signal Seven τd (n, l) of the Doppler FFT unit 4a with respect to the Doppler spectrums for all the pulse hits (n=0, 1, 2, . . . , N−1) per same Doppler frequency component (l=0, 1, 2, . . . , M−1) as shown in the formula (8).

$$S(n, l) = S_{\tau d}^{even}(n, l) \times S_{\tau d}^{odd}(n, l)* \qquad \text{[Formula 8]}$$

$$l = 0, 1, 2, \ldots, M-1$$

$$n = 0, 1, 2, \ldots, N-1$$

A phase of each frequency component of a result S(n, l) obtained by the formula (8) takes a fixed value with respect to all the pulse hits irrespective of the velocity of the observation target. Accordingly, the above observation and processing are repeated with respect to the pulse hits conducted N-times, and the result obtained is simply subjected to the complex addition N-times with respect to the same Doppler frequency component in the complex adding unit 9 as shown in the formula (9), whereby the receiving signals can be coherently integrated both in the pulse and between the pulses.

$$S_{Out}(l) = \sum_{n=0}^{N-1} S(n, l) \qquad \text{[Formula 9]}$$

$$l = 0, 1, 2, \ldots, M-1$$

As discussed above, in the radar system in the embodiment 2, the receiving signal data are divided into the two groups of data, i.e., the even-numbered data and the odd-numbered data, and hence an observation time difference between two pieces of data is the shortest in executable data dividing methods. Therefore, a coherent integration effect for the change in velocity of the observation target is maximized.

Figure 3:
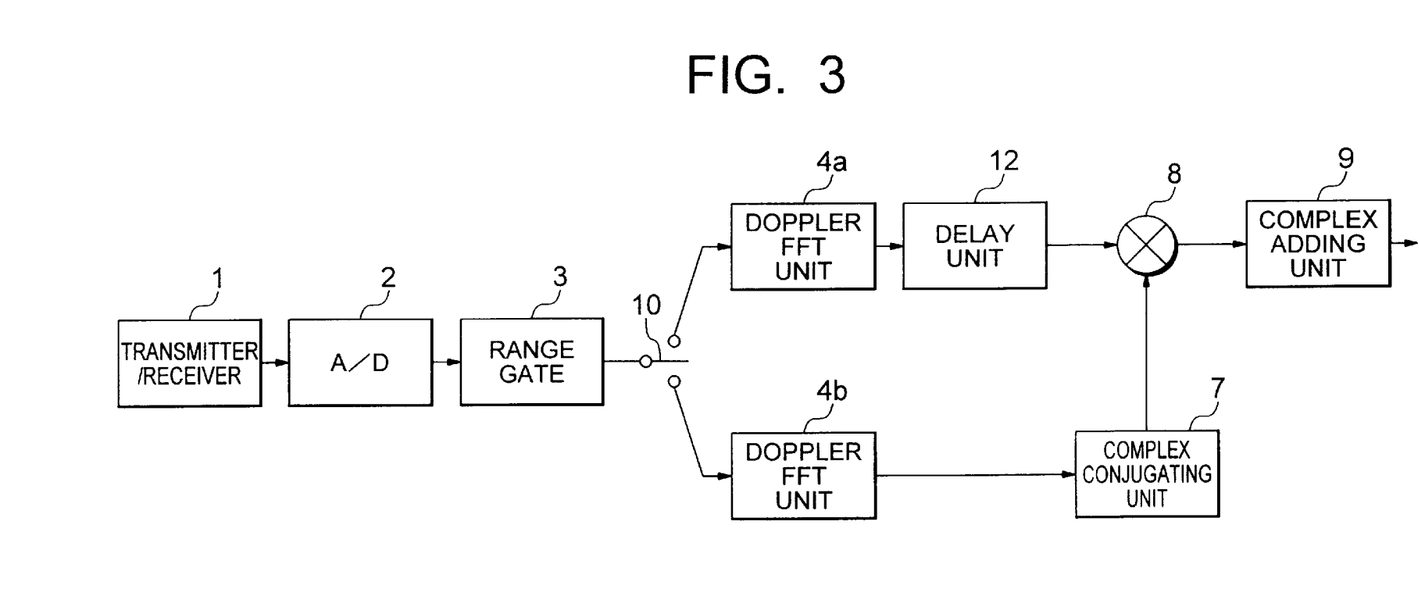
FIG. 3 is a block diagram showing a construction of the radar system in an embodiment 3 of the present invention.

Embodiment 3:

The radar system in an embodiment 3 of the present invention will be described with reference to the drawings. FIG. 3 is a block diagram showing a construction of the radar system in the embodiment 3 of the present invention.

Referring to FIG. 3, a delay unit 12 newly added is provided posterior to the Doppler FFT unit 4a for the former half of data in order to take synchronism of the output of the Doppler FFT unit 4a for effecting the fast Fourier transform of the former half of the data and the output of the Doppler FFT unit 4b for effecting the fast Fourier transform of the latter half of the data. Note that the same components as those in the embodiments 1 and 2 and of the prior art system are marked with the same numerals, of which the repetitive explanations are omitted.

An operation in the embodiment 3 will be described referring to FIG. 3.

In the radar system according to the embodiment 3, the switch 10 divides the receiving signals each having a time corresponding to the pulse width τ which are outputted from the range gate 3 into two groups, i.e., the former half of the data and the latter half of the data. The thus divided receiving signal data are given by the following formulae (10) and (11).

$$S_{\tau d}^{former}(n,k) = S_{\tau d}(n,k) \qquad \text{[Formula 10]}$$

$$S_{\tau d}^{latter}(n,k) = S_{\tau d}(n, M{=}k) \qquad \text{[Formula 11]}$$

k=0,1,2, . . . , M−1
n=0,1,2, . . . , N−1

Of the two groups of the data thus divided, the former half of the data Sformerτd (n, k) is fast-Fourier-transformed by the Doppler FFT unit 4a provided in the upper part in FIG. 3, while the latter half of the data Slatter τd (n, k) is fast-Fourier-transformed by the Doppler FFT unit 4b provided in the lower part therein. Those pieces of data are decomposed per Doppler frequency and coherently integrated with respect to the same Doppler frequency component. Results of the integration become as in the following formulae (12) and (13).

$$S_{\tau d}^{former}(n, l) = \sum_{k=0}^{M-1} S_{\tau d}^{former}(n, k) e^{-j2\pi \frac{kl}{M}} \qquad \text{[Formula 13]}$$

$$S_{\tau d}^{latter}(n, l) = \sum_{k=0}^{M-1} S_{\tau d}^{latter}(n, k) e^{-j2\pi \frac{kl}{M}}$$

$$l = 0, 1, 2, \ldots, 2M - 1$$

$$n = 0, 1, 2, \ldots, N - 1$$

Sformerτd (n, l) as a result of the FFT of the former half of the data is synchronized by the delay unit 12 with the output of Slatterτd (n, l) as a result of the FFT of the latter half of the data. Then, just when these two results are given, the complex conjugation and the complex multiplication are carried out as in the following formula (14).

$$S(n,l) = S_{\tau d}^{former}(n,l) \times S_{\tau d}^{latter}(n,l)^* \qquad \text{[Formula 14]}$$

l=0,1,2, . . . , M−1
n=0,1,2, . . . , N−1

With respect to S (n, l) as a result obtained by the complex conjugation and the complex multiplication of the Doppler spectrums based on the formula (14), as in the embodiment 2, the complex adding process shown in the formula (9) is executed, whereby the receiving signals can be coherently integrated both in the pulse and between the pulse hits.

As discussed above, the radar system in the embodiment 3, because of the receiving signal data being divided corresponding to the former half and the latter half of the observation time, can be constructed at low costs without requiring the memories when dividing the data.

Figure 4:
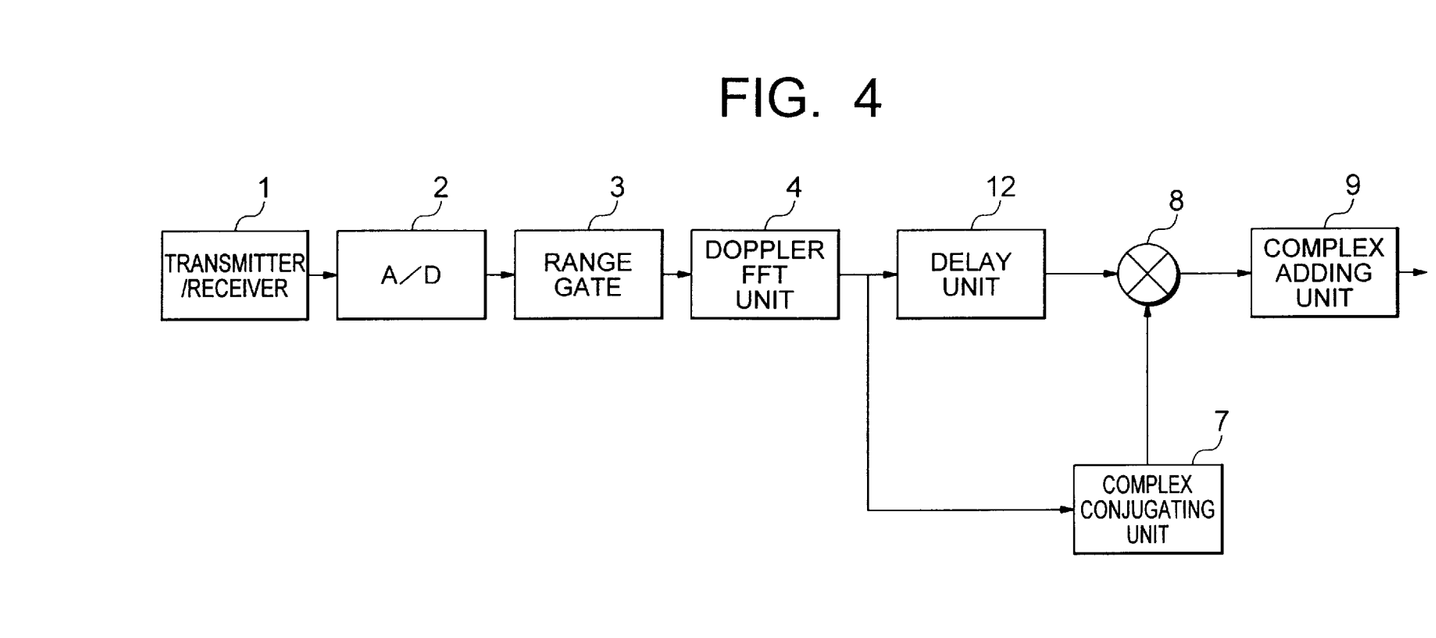
FIG. 4 is a block diagram showing a construction of the radar system in an embodiment 4 of the present invention.

Embodiment 4:

The radar system in an embodiment 4 of the present invention will be described with reference to the drawings. FIG. 4 is a block diagram showing a construction of the radar system in the embodiment 4 of the present invention.

Referring to FIG. 4, the same components as those in the embodiments 1 to 3 and of the prior art system are marked with the same numerals, of which the repetitive explanations are omitted.

In the radar systems in the embodiments 1 through 3, the receiving signals each having the time corresponding to the pulse width τ which are outputted from the range gate 3, are divided into the two groups of data. Accordingly, the two Doppler FFT units 4a, 4b are provided for fast-Fourier-transforming the two groups of thus divided data.

In the radar system in the embodiment 4, with a technical emphasis that the receiving signal data are divided based on the former half and the latter half on the time-axis, M-pieces of receiving signals as the former half of 2M-pieces of receiving signals and M-pieces of receiving signals as the latter half thereof, are sequentially fast-Fourier-transformed, whereby the two Doppler FFT units can be reduced by 1. Further, this leads to a reduction in the number of switches 10 for switching over the connection between the range gate 3 and the two Doppler FFT units 4a, 4b.

As discussed above, in the radar system according to the embodiment 4, one of the two Doppler FFT units 4a, 4b is omitted, and the number of the switches 10 is decreased, whereby the system can be constructed at lower costs.

Figure 5:
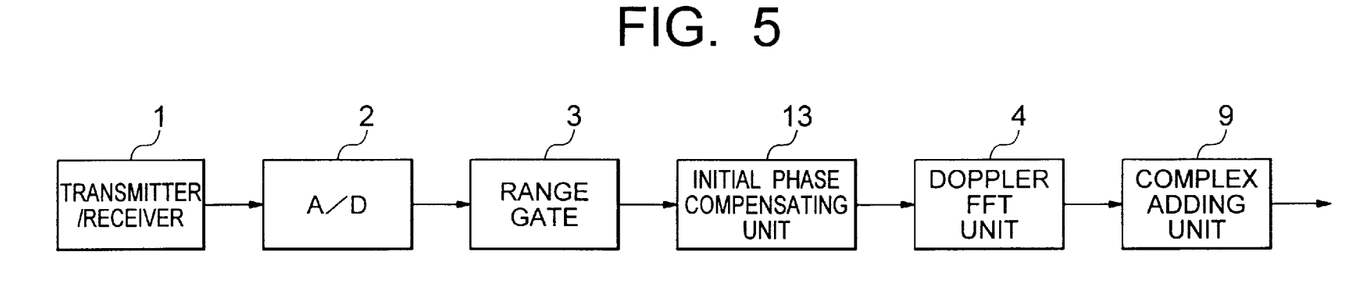
FIG. 5 is a block diagram showing a construction of the radar system in an embodiment 5 of the present invention.

Embodiment 5:

The radar system in an embodiment 5 of the present invention will be described with reference to the drawings. FIG. 5 is a block diagram showing a construction of the radar system in the embodiment 5 of the present invention.

Referring to FIG. 5, the numeral 13 designates an initial phase compensating unit. Note that the same components as those in the embodiments 1 to 4 and of the prior art system are marked with the same numerals, of which the repetitive explanations are omitted.

The radar system in the embodiment 5, as by the radar system in the respective embodiments discussed above, repeatedly transmits the electromagnetic waves with the pulse width τ at the pulse interval τPRI. The transmitter/receiver 1 detects a phase of the receiving signal, and the A/D converter 2 converts the receiving signal into a digital signal at a sampling interval τS. Then, the range gate 3 extracts the receiving signal having a time corresponding to the pulse width τ at an interval of a delay time τd corresponding to a distance from the observation target. At this time, the digitized receiving signal can be expressed in the formula (1) by use of a pulse number n and a sample number m in the pulse width.

$$S_{\tau d}(n,m) \qquad \text{[Formula 1]}$$

m=0,1,2, . . . , 2M−1
n=0,1,2, . . . , N−1

This receiving signal Sτd (n, m) is at first inputted to the initial phase compensating unit 13, wherein an initial phase of the receiving signal per receiving pulse is compensated to 0 by a calculation in the following formula (15).

$$S_{\tau d}^{comp}(n, m) = S_{\tau d}(n, m) \times S_{\tau d}(n, l)^* \qquad \text{[Formula 15]}$$

$$m = 0, 1, 2, \ldots, 2M - 1$$

$$n = 0, 1, 2, \ldots, N - 1$$

A receiving signal Scompτd (n, m) after compensating the phase is fast-Fourier-trans formed by the Doppler FFT unit 4 as shown in the formula (16), then decomposed per Doppler frequency, and coherently integrated corresponding to the number of sample points (2M) in the pulse with respect to the same Doppler frequency component.

$$S_{\tau d}(n, l) = \sum_{m=0}^{2M-1} S_{\tau d}^{comp}(n, m) e^{-j2\pi \frac{ml}{2M}} \qquad \text{[Formula 16]}$$

$$l = 0, 1, 2, \ldots, 2M - 1$$

$$n = 0, 1, 2, \ldots, N - 1$$

A Doppler spectrum Sτd (n, l) per pulse hit, which is obtained from the receiving signal Scompτd (n, m) after compensating the phase in the formula (16), assumes a fixed phase at all the pulse hits irrespective of a target velocity. Hence, the spectrum S τd (n, l) is repeatedly obtained with respect to N-pieces of pulses received, and, as expressed by the following formula (17), the complex adder 9 executes the complex addition with respect to the same Doppler frequency component, whereby the receiving signals can be coherently integrated both in the pulse and between the pulses.

$$S_{out}(l)=\Sigma S_{\tau d}(n, l) \quad \text{[Formula 17]}$$

where n=0~N−1, and l=0, 1, 2, ..., 2M−1.

As discussed above, the radar system in the embodiment 5 can be constructed at low costs simply by adding the initial phase compensating unit 13 and the complex adder 9 as a substitute for the conventional PDI to this type of radar system that has hitherto been used, and is thereby capable of coherently integrating the receiving signals both in the pulse and between the pulses.

What is claimed is:

1. A radar system comprising:
    a transmitter/receiver for transmitting repeatedly electromagnetic waves which are pulse-modulated with a predetermined pulse width at a predetermined pulse interval, and detecting a phase of a receiving signal reflected from an observation target;
    A/D converting means for converting the receiving signal into a digital signal at a predetermined sampling interval;
    range gate means for extracting the receiving signal having a time corresponding to the predetermined pulse width at an interval of a delay time corresponding to a distance from the observation target;
    data dividing means for dividing the receiving signals into two groups of data, which come from the observation target located at the same distance;
    first Doppler FFT means for fast-Fourier-transforming one group of data of the two groups of divided data;
    second Doppler FFT means for fast-Fourier-transforming the other group of data of the two groups of divided data;
    complex conjugating means for taking a complex conjugate of an output of said second Doppler FFT means;
    complex multiplying means for performing a complex multiplication for the every same Doppler frequency component with respect to an output of said first Doppler FFT means and an output of said complex conjugating means; and
    complex adding means for repeating the observation and processing a plural number of times, and coherently adding an obtained result of the complex multiplication the same number of times as the repetitions with respect to the same Doppler frequency component.

2. A radar system according to claim 1, wherein said data dividing means includes:
    a switch for dividing the receiving signals outputted from said range gate means into two groups of even-numbered data and odd-numbered data;
    a first memory for storing the even-numbered or odd-numbered data; and
    a second memory for storing the odd-numbered or even-numbered data,
    said first Doppler FFT means fast-Fourier-transforms the data stored in said first memory, and
    said second Doppler FFT means fast-Fourier-transforms the data stored in said second memory.

3. A radar system according to claim 1, wherein said data dividing means is a switch for dividing the signals outputted from said range gate means into two groups of data based on a former half of an observation time and a latter half of the observation time, and
    said radar system further comprises delay means, provided posterior to said first Doppler FFT means, for taking synchronism of an output of said first Doppler FFT means for fast-Fourier-transforming the former half of the data and an output of said second Doppler FFT means for fast-Fourier-transforming the latter half of the data.

4. A radar system comprising:
    a transmitter/receiver for transmitting electromagnetic waves which are pulse-modulated with a predetermined pulse width at a predetermined pulse interval, and detecting a phase of a receiving signal reflected from an observation target;
    A/D converting means for converting the receiving signal into a digital signal at a predetermined sampling interval;
    range gate means for extracting the receiving signal having a time corresponding to the predetermined pulse width at an interval of a delay time corresponding to a distance from the observation target;
    Doppler FFT means for fast-Fourier-transforming two groups of data in time-division based on a former half of an observation time and a latter half of the observation time with respect to the signals outputted from said range gate means;
    delay means for synchronizing an output of a result of the FFT processing of the former half of the data with a result of the FFT processing of the latter half of the data;
    complex conjugating means for taking a complex conjugate of an output of said Doppler FFT means;
    complex multiplying means for performing a complex multiplication for the every same Doppler frequency component with respect to an output of said delay means and an output of said complex conjugating means; and
    complex adding means for repeating the observation and processing a plural number of times, and coherently adding an obtained result of the complex multiplication the same number of times as the repetitions with respect to the same Doppler frequency component.

5. A radar system comprising:
    a transmitter/receiver for transmitting electromagnetic waves which are pulse-modulated with a predetermined pulse width at a predetermined pulse interval, and detecting a phase of a receiving signal reflected from an observation target;
    A/D converting means for converting the receiving signal into a digital signal at a predetermined sampling interval;
    range gate means for extracting the receiving signal having a time corresponding to the predetermined pulse width at an interval of a delay time corresponding to a distance from the observation target;
    initial phase compensating means for compensating a phase so that an initial phase of the receiving signal coming from the observation target located at the same distance becomes zero;
    Doppler FFT means for fast-Fourier-transforming the receiving signal after compensating the phase; and complex adding means for repeating the observation and processing a plural number of times, and coherently adding an obtained result of the FFT processing the same number of times as the repetitions with respect to the same Doppler frequency component.

6. A coherent integrating method of a radar system, comprising:

a step of extracting a receiving signal sampled within one pulse per transmission pulse from receiving signal data;

a step of dividing the extracted receiving signal data for one pulse hit into two groups of data;

a step of fast-Fourier-transforming each piece of data among the two groups of the divided receiving signal data;

a step of performing a complex conjugating operation of one of two FFT processing results;

a step of executing a complex multiplication of the other FFT processing result of the two FFT processing results and a result of the complex conjugating operation; and a step of repeatedly executing the processes up to the complex multiplication with respect to an arbitrary number of transmission pulses, and performing a complex addition of an obtained result of the complex multiplication for the every same Doppler frequency component.

7. A coherent integrating method of a radar system according to claim 6, wherein said dividing step is to divide every set of the extracted receiving signal data for one pulse hit into even-numbered data and odd-numbered data.

8. A coherent integrating method of a radar system according to claim 6, wherein said dividing step is to divide the extracted receiving signal data for one pulse hit into two groups of data based on a former half of a pulse width and a latter half of the pulse width, and said method further comprises a step of delaying the former half of the fast-Fourier-transformed data by a predetermined time in order to take synchronism of the former half of the fast-Fourier-transformed data and the latter half of the fast-Fourier-transformed data.

9. A coherent integrating method of a radar system, comprising:

a step of extracting a receiving signal sampled within one pulse per transmission pulse from receiving signal data;

a step of fast-Fourier-transforming the extracted receiving signals into two groups of data based on a former half of an observation time and a latter half of the observation time;

a step of delaying the former half of the fast-Fourier-transformed data by a predetermined time in order to take synchronism of the former half of the fast-Fourier-transformed data and the latter half of the fast-Fourier-transformed data;

a step of executing a complex conjugating operation with respect to one of two FFT processing results;

a step of executing a complex multiplication of the other FFT processing result of the two FFT processing results and a result of the complex conjugating operation; and a step of repeatedly executing the processes up to the complex multiplication with respect to an arbitrary number of transmission pulses, and performing a complex addition of an obtained result of the complex multiplication for the every same Doppler frequency component.

10. A coherent integrating method of a radar system, comprising:

a step of extracting a receiving signal sampled within one pulse per transmission pulse from receiving signal data;

a step of compensating a phase so that an initial phase of the receiving signal coming from an observation target located at the same distance becomes zero;

a step of fast-Fourier-transforming the receiving signal data after compensating the phase; and a step of repeatedly executing the processes up to the FFT processing with respect to an arbitrary number of transmission pulses, and performing a complex addition of an obtained result of the FFT processing for the every same Doppler frequency component.

* * * * *